Dec. 24, 1963     E. JADOT     3,115,390
METHOD FOR PREPARING DIAMMONIUM PHOSPHATE, STARTING
FROM PHOSPHORIC ACID PRODUCED BY THE WET PROCESS
Filed Oct. 26, 1960
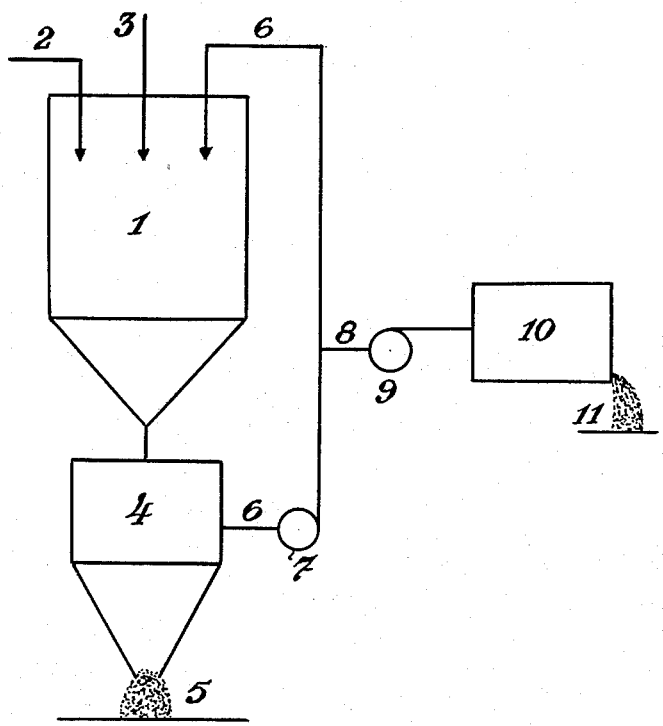
INVENTOR
EDGARD JADOT
BY *Robert H. Jacob*
AGT.

United States Patent Office 3,115,390
Patented Dec. 24, 1963

3,115,390
METHOD FOR PREPARING DIAMMONIUM PHOSPHATE, STARTING FROM PHOSPHORIC ACID PRODUCED BY THE WET PROCESS
Edgard Jadot, Engis, Belgium, assignor to Panmetals and Processes Inc., Panama, Panama, a company of Panama
Filed Oct. 26, 1960, Ser. No. 65,183
Claims priority, application France Oct. 28, 1959
5 Claims. (Cl. 23—107)

Preparing diammonium phosphate, with the starting materials being phosphoric acid obtained by the dry process and ammonia, is an easy matter and of common practice. Such manufacturing method essentially comprises neutralizing phosphoric acid with ammonia, in a saturating vessel, under known conditions as regards pH, temperature and concentration, such as to cause crystallization of the resulting diammonium phosphate, then separating the diammonium phosphate crystals from their mother-liquor in a hydro-extractor and re-introducing such mother-liquor into the saturator.

Such method proved to be practically impossible to perform when phosphoric acid prepared by the wet process is used, on account of the impurities contained therein, especially $Fe_2O_3$, $Al_2O_3$, F and $SO_3$. Practically, the $Fe_2O_3$ and $Al_2O_3$ contents depend solely upon the analysis of the phosphate-bearing ore which was used for the production of the phosphoric acid, while the F content depends on the ore and on the manufacturing process of the phosphoric acid, the $SO_3$ content depending solely on the process. Tests have shown that, when phosphoric acid is being neutralized with ammonia, the $(NH_4)^+$ and the $(HPO_4)^{--}$ ions precipitate upon the germs of diammonium phosphate which are present, thus contributing to the formation of crystals; however, those crystals cannot admit the impurities of the acid into their lattice; therefore, such impurities remain in the mother-liquor. After the crystals have been separated by centrifugation, the mother liquor is re-introduced into the saturating vessel, where the same phenomenon takes place again. Thus, the impurity content of the mother-liquor will constantly increase and, after a few operating cycles, will reach the solubility limit for the operating conditions; at this stage, the impurities would precipitate upon the germs present, thus preventing their growth and rendering their separation by hydro-extracting very difficult. Moreover, a marked increase in the viscosity of the mother-liquor is noted at that stage, which renders practically impossible the achievement of both the chemical (reaction) and the physical (crystallization) phenomena.

Those two combined actions, viz., complicating the reaction and the crystallization, on the one hand, and sliming the crystalline precipitate with impurities, on the other hand, render the practice of the process practically impossible under commercially economical conditions.

To avoid the aforesaid shortcomings, a known method effects in the first place neutralization of the phosphoric acid to a pH of 4 to 4.5 under such conditions as will cause the impurities, especially $Fe_2O_3$ and $Al_2O_3$, to become incorporated into compounds that precipitate and are separated by filtration, the filtered solution being then treated in a second neutralization stage, to be converted into diammonium phosphate. The latter is obtained in a crystalline and very pure state; however the two-stage neutralizing process is complicated; the filtration of the intermediate precipitate is difficult to achieve; and the precipitate is difficult to valorize.

Another known method eliminates the need for crystallizing the diammonium phosphate, for separating of the crystals by hydro-extracting and for recirculating the mother-liquor. It comprises impasting the slurry issuing from the saturating vessel (a mixture of mother-liquor and crystals) by mixing it with dry product, and granulating and drying the whole mass, which will thereafter be screened in order to separate the product of suitable grain size, while the remaining fractions are recycled to the slurry impasting stage after being ground, if desired. Considering the inclusion of impurities, it is impossible to obtain a product of very high concentration. Moreover, the enormous recirculation of dried product to the impasting stage requires handling about 100% of the amount produced. Getting at all times a granulated product is a further drawback, especially when it has to be admixed into compound fertilizers.

The invention provides a method enabling the use of phosphoric acid prepared by the wet process, which method does not exhibit the major disadvantages inherent to known methods. The research work and tests effected by applicant have evidenced that it is quite possible to allow phosphoric acid to react with ammonia in order to form diammonium phosphate, and cause the latter to crystallize in mother-liquor in which the ratio of impurities to $P_2O_5$ (which ratio will be referred to as the "impurity ratio") is higher than that existing usually in wet process phosphoric acid, provided that the impurity ratio is kept below the one which marks the solubility limit beyond which crystallization of diammonium phosphate is impeded.

According to the invention, settling the impurity rate of the mother-liquor at the desired level, and maintaining the said level are achieved by tapping a suitable proportion of the mother-liquor which is recirculated to the saturator subsequent to hydro-extracting.

Further according to the invention, the proportion of the mother-liquor which is not recirculated to the saturator is fed to a dryer in order to obtain a product usable as a fertilizer.

The accompanying drawing shows diagrammatically a plant for carrying out the method according to the invention.

In the drawing, 1 indicates the saturating vessel comprised of a tank in which phosphoric acid, which is supplied at 2, is neutralized with ammonia, which is lead in at 3, while complying with such conditions of pH, temperature and concentration as will cause crystallization of the resulting diammonium phosphate. The mass obtained as a result of the reaction is then introduced into a hydro-extractor 4, where the crystals of diammonium phosphate 5 are separated from their mother-liquor, which is discharged through the return duct 6 leading to the saturator. The plant so far corresponds with the one used for preparing diammonium phosphate where the starting material employed is phosphoric acid obtained by the dry process, and thus pure. In the known plant, the whole mass of the said mother-liquor is returned to the saturator 1 by means of a pump 7. To carry out the present invention, a suitable fraction of the mother-liquor is drawn off from the flow 6 through the tapping duct 8 whose flow may be adjusted by means of a feed regulating pump 9 which delivers the said fraction to a dryer 10, whence a dry product 11 is collected, which may be used as a fertilizer, for instance in pulverulent form.

The proportion of mother-liquor to be drawn off by tapping depends upon the impurity content of the phosphoric acid. The proportion should be such that the impurity rate of circulating mother-liquor, as far as $Fe_2O_3$ and $Al_2O_3$ are concerned, does not exceed the value:

$$\frac{Fe_2O_3+Al_2O_3}{P_2O_5}=0.10$$

This is the fundamental condition to be complied with in order to carry the method of the invention into effect. While the rates of secondary impurities are not of prime importance, it is nevertheless of advantage to keep them within the following limits:

$$\frac{F}{P_2O_5} \leq 0.10$$

$$\frac{SO_3}{P_2O_5} \leq 0.30$$

In practice, all that need be done is to see to it that the relative amount of the tap should exceed the one that would lead to extreme acceptable impurity rates in the mother-liquor, so that the actual rates should be kept below such extreme rates and the process should proceed normally, without any special difficulty. Adapting the method to the treatment of phosphoric acids originating from different phosphates is an easy matter, since all that need be done is matching the relative amount of the tap with the impurity content of the starting materials.

Processing that fraction of the mother-liquor which forms the tap will yield a product which is valuable as a fertilizer. In fact, the product obtained by drying the mother-liquor usually contains from 15 to 20% nitrogen and from 35 to 45% $P_2O_5$ soluble in water and in citrate. The preferred composition is, however, about 16% nitrogen and about 40% $P_2O_5$ soluble in water and in citrate, since such contents are in the same ratio as those of diammonium phosphate, and allow for the possible addition of nitric nitrogen under the form of ammonium nitrate, while still providing a well-balanced fertilizer.

By way of example, one may quote the use of wet process phosphoric acid prepared from kola phosphate and having the following impurity rates:

$$\frac{Fe_2O_3+Al_2O_3}{P_2O_5}=0.025; \quad \frac{F}{P_2O_5}=0.018; \quad \frac{SO_3}{P_2O_5}=0.06$$

The method according to the invention has been carried out under good conditions, the impurities in the circulating solutions being kept at rates attaining approximately the following figures:

$$\frac{Fe_2O_3+Al_2O_3}{P_2O_5}=0.085; \quad \frac{F}{P_2O_5}=0.07; \quad \frac{SO_3}{P_2O_5}=0.20$$

It has been found that the diammonium phosphate crystals which are separated by hydro-extracting carry along a few impurities with the following rates:

$$\frac{Fe_2O_3+Al_2O_3}{P_2O_5}=0.007; \quad \frac{F}{P_2O_5}=0.004; \quad \frac{SO_3}{P_2O_5}=0.02$$

When striking the balance, it will be found that, under the aforesaid conditions, about 80% of the $P_2O_5$ present in the starting acid are recovered under the form of crystallized diammonium phosphate containing from 50 to 52% $P_2O_5$ and from 20 to 21% N, while about 20% are taken by the tap, yielding a dry product, e.g. in pulverulent form, containing from 40 to 42% $P_2O_5$ and from 15 to 16% N.

It will be seen that the method according to the invention makes it possible to prepare crystallized diammonium phosphate under commercially economical conditions, starting from phosphoric acid prepared by the wet process, the object of the invention being achieved owing to a simple manner of controlling the impurity rate of the mother-liquor, which rate only needs to be kept below the limits quoted. The method may be carried out by means of a known plant for preparing diammonium phosphate where dry process phosphoric acid is used as the starting material; and all that need be done is to add to such plant the necessary components for effecting the tap and drying the tapped mother-liquor.

The method of the invention has still further advantages, among which the following may be named:

(a) Neither waste products nor by-products are yielded, since both finished products are of a high marketing value, viz., on the one hand, the crystallized diammonium phosphate, similar to that obtained when starting from pure phosphoric acid prepared by the thermic process; on the other hand, the product resulting from drying the tapped mother-liquor and which forms a fertilizer of proper composition, the said product being highly valuable on account of a large amount of $P_2O_5$ present;

(b) The method can be carried out easily and eliminates the need for any separation of iron or alumina precipitate, which has always been an intricate matter;

(c) The method may be readily made suitable for the treatment of acids originating from various phosphates, by selecting the relative amount of the said tap, so as to maintain the impurity rate, especially that of $Fe_2O_3$ and $Al_2O_3$, within the above stated limits;

(d) The method is quite flexible in operating, since the impurity rates to be observed are maximum values determining the minimum relative amount of mother-liquor to be drawn off.

If required for some other reasons (such as a larger demand for the dried product from tapped mother-liquor, or variation in analysis to be imparted to such product, etc.), the relative amount of the tapped portion may be increased at will, which will result in a decrease of the impurity rate in the circulating solutions.

What I claim is:

1. A continuous method for preparing crystallized diammonium phosphate including the steps of introducing wet process phosphoric acid and ammonia into a saturator, causing crystallization of the resulting diammonium phosphate therein, transferring the material into a hydro-extractor and separating therein the resulting crystallized diammonium phosphate from the mother-liquor, recirculating the mother-liquor to the saturator, and tapping a relative amount of the return flow of mother-liquor to the saturator in a manner that the impurity ratio $$\frac{Fe_2O_3+Al_2O_3}{P_2O_5}$$

in the circulating solutions will not exceed about 1:10.

2. A continuous method for preparing crystallized diammonium phosphate including the steps of introducing wet process phosphoric acid and ammonia into a saturator, causing crystallization of the resulting diammonium phosphate therein, transferring the material into a hydro-extractor and separating therein the resulting crystallized diammonium phosphate from the mother-liquor, recirculating the mother-liquor to the saturator, and tapping a relative amount of the return flow of mother-liquor to the saturator in a manner that the impurity ratio $$\frac{Fe_2O_3+Al_2O_3}{P_2O_5}$$

in the circulating solutions will not exceed about 1:10, said mother-liquor drawn off by tapping being treated in a dryer to yield a dry product, usable as a fertilizer and containing from 15 to 20% of N and from 35 to 45% of $P_2O_5$ soluble in water and in citrate.

3. A continuous method for preparing crystallized diammonium phosphate including the steps of introducing wet process phosphoric acid and ammonia into a saturator, causing crystallization of the resulting diammonium phosphate therein, transferring the material into a hydro-extractor and separating therein the resulting crystallized diammonium phosphate from the mother-liquor, recirculating the mother-liquor to the saturator, and tapping a relative amount of the return flow of mother-liquor to the saturator in a manner that the impurity ratio $$\frac{Fe_2O_3+Al_2O_3}{P_2O_5}$$

in the circulating solutions will not exceed about 1:10, the relative amount of the tap being determined in a manner that the impurity ratio $$\frac{F}{P_2O_5}$$

in the circulating solutions should not exceed about 1:10.

4. A continuous method for preparing crystallized diammonium phosphate including the steps of introducing wet process phosphoric acid and ammonia into a saturator, causing crystallization of the resulting diammonium phosphate therein, transferring the material into a hydro-extractor and separating therein the resulting crystallized diammonium phosphate from the mother-liquor, recirculating the mother-liquor to the saturator, and tapping a relative amount of the return flow of mother-liquor to the saturator in a manner that the impurity ratio $$\frac{Fe_2O_3+Al_2O_3}{P_2O_5}$$

in the circulating solutions will not exceed about 1:10, the relative amount of the tap being determined in a manner that the impurity ratio $$\frac{SO_3}{P_2O_5}$$

in the circulating solutions should not exceed about 3:10.

5. A continuous method according to claim 1 wherein the tapped relative amount of mother-liquor is usable as a fertilizer.

References Cited in the file of this patent

UNITED STATES PATENTS

| | | |
|---|---|---|
| 1,670,504 | Griessbach | May 22, 1928 |
| 1,716,415 | Buchanan | June 11, 1929 |
| 1,859,835 | Mitteau | May 24, 1932 |
| 3,005,696 | Hignett et al. | Oct. 24, 1961 |
| 3,015,552 | Striplin et al. | Jan. 2, 1962 |
| 3,019,099 | Walters | Jan. 30, 1962 |